(12) United States Patent
Yorimoto

(10) Patent No.: US 8,325,572 B2
(45) Date of Patent: Dec. 4, 2012

(54) OPTICAL DISK RECORDING APPARATUS AND METHOD FOR CONTROLLING OPTICAL DISK RECORDING

(75) Inventor: Kenji Yorimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 799 days.

(21) Appl. No.: 12/296,005

(22) PCT Filed: Apr. 20, 2007

(86) PCT No.: PCT/JP2007/059140
§ 371 (c)(1),
(2), (4) Date: Oct. 3, 2008

(87) PCT Pub. No.: WO2007/123275
PCT Pub. Date: Nov. 1, 2007

(65) Prior Publication Data
US 2009/0168617 A1    Jul. 2, 2009

(30) Foreign Application Priority Data

Apr. 21, 2006   (JP) ................................. 2006-118362

(51) Int. Cl.
*G11B 7/00* (2006.01)
(52) U.S. Cl. ................ 369/47.14; 369/47.15; 369/53.17
(58) Field of Classification Search ............... 369/47.14, 369/47.15, 53.17
See application file for complete search history.

(56) References Cited

U.S. PATENT DOCUMENTS

| 2004/0004919 A1* | 1/2004 | Park et al. ................. 369/47.14 |
| 2004/0174785 A1* | 9/2004 | Ueda et al. ................. 369/47.14 |
| 2006/0007801 A1 | 1/2006 | Takashima |

FOREIGN PATENT DOCUMENTS

| JP | 2-242326 | 9/1990 |
| JP | 7 87287 | 3/1995 |
| JP | 2002 521787 | 7/2002 |
| JP | 2006 24287 | 1/2006 |
| JP | 2006 24300 | 1/2006 |
| WO | WO 2004105021 A1 * | 12/2004 |

OTHER PUBLICATIONS

Office Action issued Aug. 30, 2011, in Japanese Patent Application No. 2006-118362.

* cited by examiner

*Primary Examiner* — Latanya Bibbins
(74) *Attorney, Agent, or Firm* — Oblon, Spivak, McClelland, Maier & Neustadt, L.L.P.

(57) ABSTRACT

To provide a simple configuration capable of recording data on an optical disc reliably at high speed even if recording errors occur. Data that is normally recorded on the optical disc is erased from a storing means, and when a recording error has occurred, a predetermined range subsequent to the address at which the recording error has occurred is selected as a skip area, and this skip area is skipped to record the data stored in the storing means from a recording resume address of the optical disc. This makes it possible to avoid repetition of recording errors in the vicinity of the error-occurring location where the possibility of repeating errors is high. Data retransmission at the time of resuming recording can also be omitted to eliminate the time loss for retransmitting the data, and to reduce the storage space of the host unit necessary for storing the data to be retransmitted.

4 Claims, 7 Drawing Sheets

OPTICAL DISK RECORDING APPARATUS AND METHOD FOR CONTROLLING OPTICAL DISK RECORDING

TECHNICAL FIELD

The present invention relates to an optical disc recording apparatus and a recording control method, and is suitably applicable to the case of recording data on an optical disc.

BACKGROUND ART optical discs of rewritable type (-RW type) capable of free recording of data by users, write-once type (-R type), and corresponding optical disc apparatuses have heretofore been in widespread use.

For the purpose of further increasing the recording capacity, Blu-ray Disc (registered trademark) has been developed which uses blue laser light (405 nm in wavelength) of wavelength shorter than those of known CDs (Compact Discs) and DVDs (Digital Versatile Discs). The Blu-ray Disc also includes a rewritable type BD-RE and a write-once type BD-R (for example, see Patent Document 1).

Patent Document 1: Jpn. Pat. Appln. Publication No. 2006-024287.

Among video recording apparatuses such as a stationary video recorder and a hand-held video camera, ones which are configured to record a video picture on an optical disc, instead of magnetic tapes theretofore in use, have become prevalent recently. These video recording apparatuses using an optical disc require that stream data on a video picture supplied from the outside or on a video picture while shooting be recorded on the optical disc in real time.

Then, the above real-time recording of stream data on the optical disc allows no interruption of recording due to recording errors, if any, since the stream data to be recorded continues to be supplied in succession. The stream data is required to be recorded so that it can be reproduced without interruption.

To meet such requirements, for example, hitherto known ATAPI drive operations defined in MMC can be used. In this case, the drive transmits a recording error notification to the host in response to the occurrence of a recording error, and then erases all the stream data in the drive data buffer. In response to reception of the recording error notification, the host reissues a WRITE instruction for another address and retransmits the stream data to the drive, whereby the data is recorded at the another address of the optical disc. The host then rewrites the file system information to combine the pieces of stream data logically so that the stream data can be recorded so as to be reproducible without interruption.

With such recording operations, however, the host must store stream data until the drive finishes recording the data, which requires a host data buffer of increased capacity. In addition, the host needs to retransmit already transmitted stream data to the drive after the occurrence of a recording error, with the disadvantage of wasting data transmission time.

Using the TSR (Timely Safe Recording) method defined in MMC-5, recording errors, if any, may be ignored to continue recording in the first phase. In the second phase, the vicinities of data undergoing the recording errors may be relocated to enable restoration of all the data undergoing the recording errors. However, there has been a problem of requiring a large volume of host data buffer, because the host must store all the data transmitted to the drive in the period until the reallocation.

DISCLOSURE OF THE INVENTION

The present invention has been achieved in view of the foregoing, to propose an optical disc recording apparatus and a recording control method which can record data on an optical disc reliably at high speed with a simple configuration.

To solve the foregoing problems, an optical disc recording apparatus according to the present invention is an optical disc recording apparatus having an optical disc drive and a host unit for controlling the optical disc drive, characterized in that, the optical disc drive includes a storing means for storing data supplied from the host unit, a recording means for sequentially reading data stored in the storing means and recording it on the optical disc; and a drive control means for erasing the data normally recorded on the optical disc from the storing means, detecting a recording error of data on the optical disc, and transmitting an address at which the recording error has occurred to the host unit along with a recording error occurrence notification, in response to reception of the recording error occurrence notification, the host unit selects a predetermined range subsequent to the address at which the recording error has occurred as a skip area, and transmits a recording resume address for skipping the skip area to resume recording the data to the optical disc drive; and in response to reception of the recording resume address, the drive control means makes the data stored in the storing means recorded from the recording resume address of the optical disc.

The data that is normally recorded on the optical disc is erased from the storing means, and when a recording error occurs, a predetermined range subsequent to the address at which the recording error has occurred is selected as a skip area, and the data stored in the storing means is recorded from a recording resume address of the optical disc so as to skip the skip area. This makes it possible to avoid repetition of recording errors in the vicinity of the error-occurring location where the possibility of repeating errors is high. Besides, data retransmission at the time of resuming recording can be omitted to eliminate the time loss for retransmitting the data, and to reduce the storage space of the host unit necessary for storing the data to be retransmitted.

A recording control method according to the present invention is a method of controlling recording of an optical disc recording apparatus having an optical disc drive and a host unit for controlling the optical disc drive, the method including: a recording error detection step of detecting a recording error of data on the optical disc in parallel with recording operations of storing supplied data in a storing means while sequentially reading it and recording it on the optical disc, and erasing the data normally recorded on the optical disc from the storing means; an error notification step of transmitting, if the recording error is detected at the recording error detection step, an address at which the recording error has occurred and a recording error occurrence notification from the optical disc drive to the host unit; a recording resume address transmission step of selecting, in response to reception of the recording error occurrence notification, a predetermined range subsequent to the address at which the recording error has occurred as a skip area, and transmitting a recording resume address for skipping the skip area to resume recording the data to the optical disc drive; and a recording resume step of recording, in response to reception of the recording resume address, the data stored in the storing means from the recording resume address of the optical disc.

The data that is normally recorded on the optical disc is erased from the storing means, and when a recording error occurs, a predetermined range subsequent to the address at which the recording error has occurred is selected as a skip area, and the data stored in the storing means is recorded from a recording resume address of the optical disc so as to skip the skip area. This makes it possible to avoid repetition of recording errors in the vicinity of the error-occurring location where the possibility of repeating errors is high. Besides, data retransmission at the time of resuming recording can be omitted to eliminate the time loss for retransmitting the data, and to reduce the storage space of the host unit necessary for storing the data to be retransmitted.

According to the present invention, data that is normally recorded on the optical disc is erased from the storing means, and when a recording error occurs, a predetermined range subsequent to the address at which the recording error has occurred is selected as a skip area, and the data stored in the storing means is recorded from a recording resume address of the optical disc so as to skip the skip area. This makes it possible to avoid repetition of recording errors in the vicinity of the error-occurring location where the possibility of repeating errors is high. Besides, data retransmission at the time of resuming recording can be omitted to eliminate the time loss for retransmitting the data, and to reduce the storage space of the host unit necessary for storing the data to be retransmitted. Consequently, it is possible to achieve an optical disc recording apparatus and a recording control method which can record data on an optical disc reliably at high speed with a simple configuration.

BEST MODE FOR CARRYING OUT THE INVENTION

Figure 1:
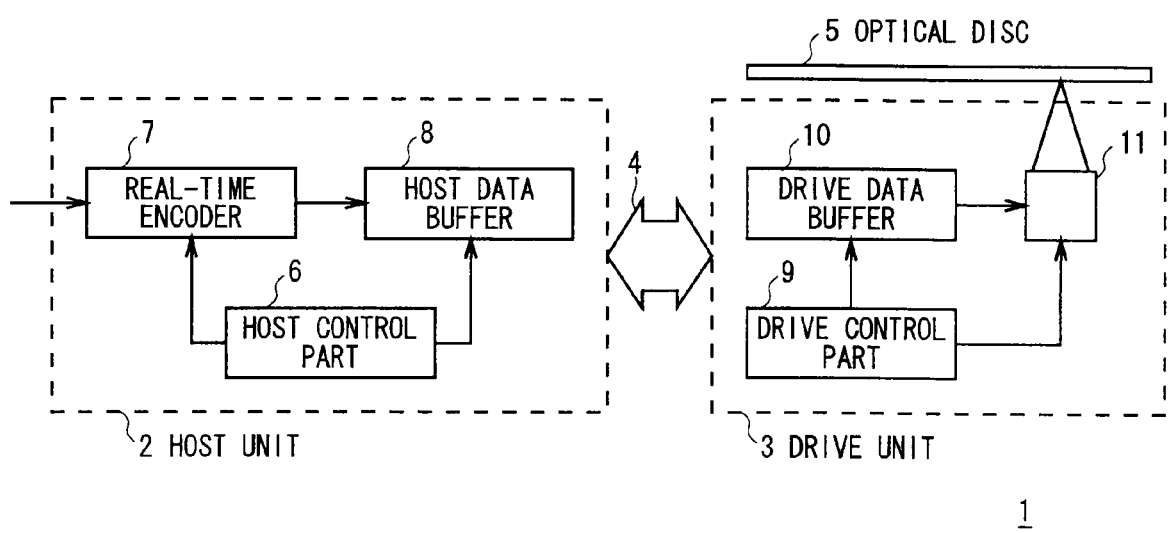
FIG. 1 is a block diagram showing the overall configuration of an optical disc recorder.

Now, an embodiment of the present invention will be described in detail with reference to the drawings.
(1) Overall Configuration of Optical Disc Apparatus Reference numeral 1 in FIG. 1 shows a whole a Blu-Ray Disc compatible optical disc recorder to which the present invention is applied as a whole. A host unit 2 for controlling the entire optical disc recorder 1 and a drive unit 3 to be controlled by the host unit 2 are connected through a bus 4. The drive unit 3 can perform recording on various types of optical discs 5 capable of random recording, such as DVD-RW, DVD+RW, and BD-RE.

The host unit 2 is formed by connecting a host control part 6 with a real-time encoder 7 and a host data buffer 8. As for the drive unit 3, a drive control part 9 controls a drive data buffer 10 and an optical pickup 11.

When recording video pictures on an optical disc 5 such as a Blu-Ray Disc, the host control part 6 of the host unit 2 encodes a video signal supplied from the outside with the real-time encoder 7 in real time to generate stream data, and temporarily stores the stream data in the host data buffer 8.

Figure 2:
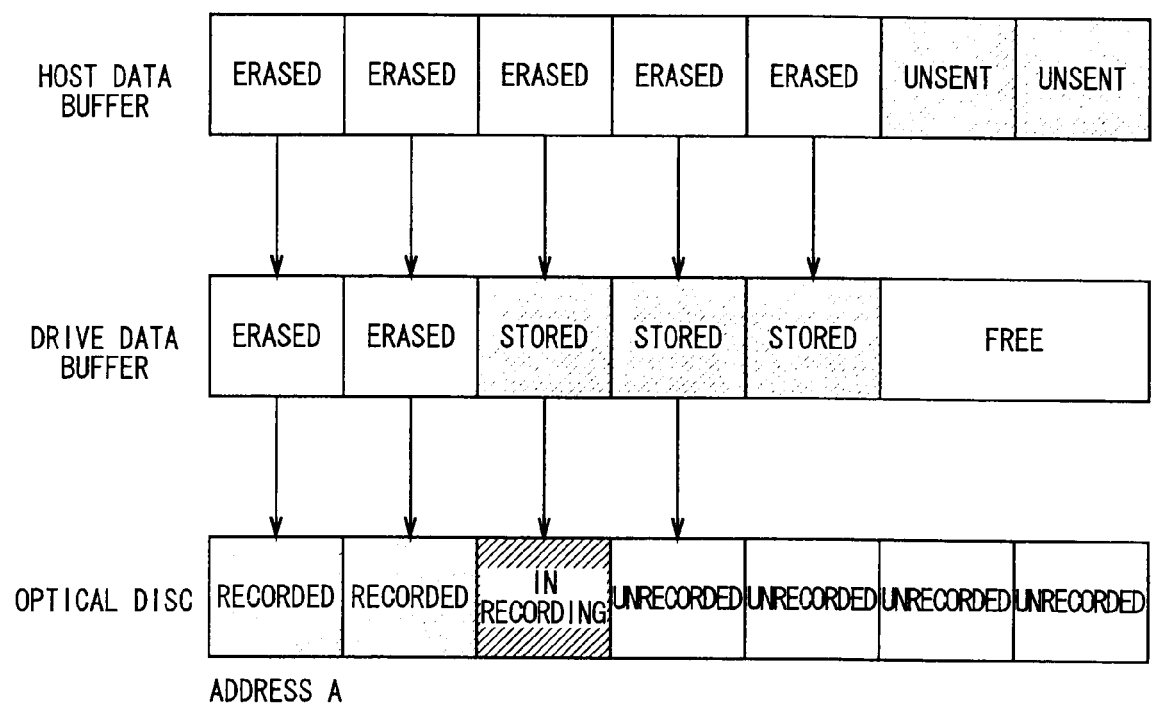
FIG. 2 is a schematic diagram showing the state of recording on an optical disc.

Then, when a predetermined amount of stream data is accumulated in the host data buffer 8, the host control part 6 sequentially reads the stream data from the host data buffer 8, transmits it to the drive unit 3 through the bus 4, and instructs to record it from a recording start address (address A) on the optical disc 5. Here, the host control part 6, as shown in FIG. 2, sequentially erases stream data that has been transmitted to the drive unit 3 from the host data buffer 8.

The drive control part 9 of the drive unit 3 temporarily stores the stream data received from the host unit 2 in the drive data buffer 10 while sequentially reading the stream data, and starts recording the stream data from the recording start address of the optical disc 5 (the address A shown in FIG. 2) by using the optical pickup 11. Here, the drive control part 9 holds the stream data in the drive data buffer 10 until recording on each ECC (Error Correction Cord) block of the optical disc 5 is completed normally (in other words, until the data is normally recorded).

The optical pickup 11 drives a laser diode (not shown) based on the stream data supplied, and irradiates the optical disc 5 with the light beam to record the stream data. Here, the drive control part 9 controls a not-shown thread drive mechanism so that the laser light emitted from the optical pickup 11 is irradiated on the recording address on the recording surface of the optical disc 5.

In addition to the foregoing configuration, when the drive control part 9 detects the occurrence of a recording error due to such causes as vibrations and a defect on the optical disc 5 during recording of stream data. The drive control part 9 transmits a recording error occurrence notification and the address at which the recording error has occurred (error address) to the host unit 2 in response. Here, the drive control part 9 does not erase the data to be recorded at the address where the recording error has occurred nor the subsequent data from, but keeps them stored in, the drive data buffer 10.

When the host control part 6 receives the recording error occurrence notification and the error address from the drive unit 3, the host control part 6 grasps, from the error address, how far the stream data has been recorded on the optical disc 5 successfully, and then searches the optical disc 5 for a recordable area based on file system information on the optical disc 5.

Figure 3:
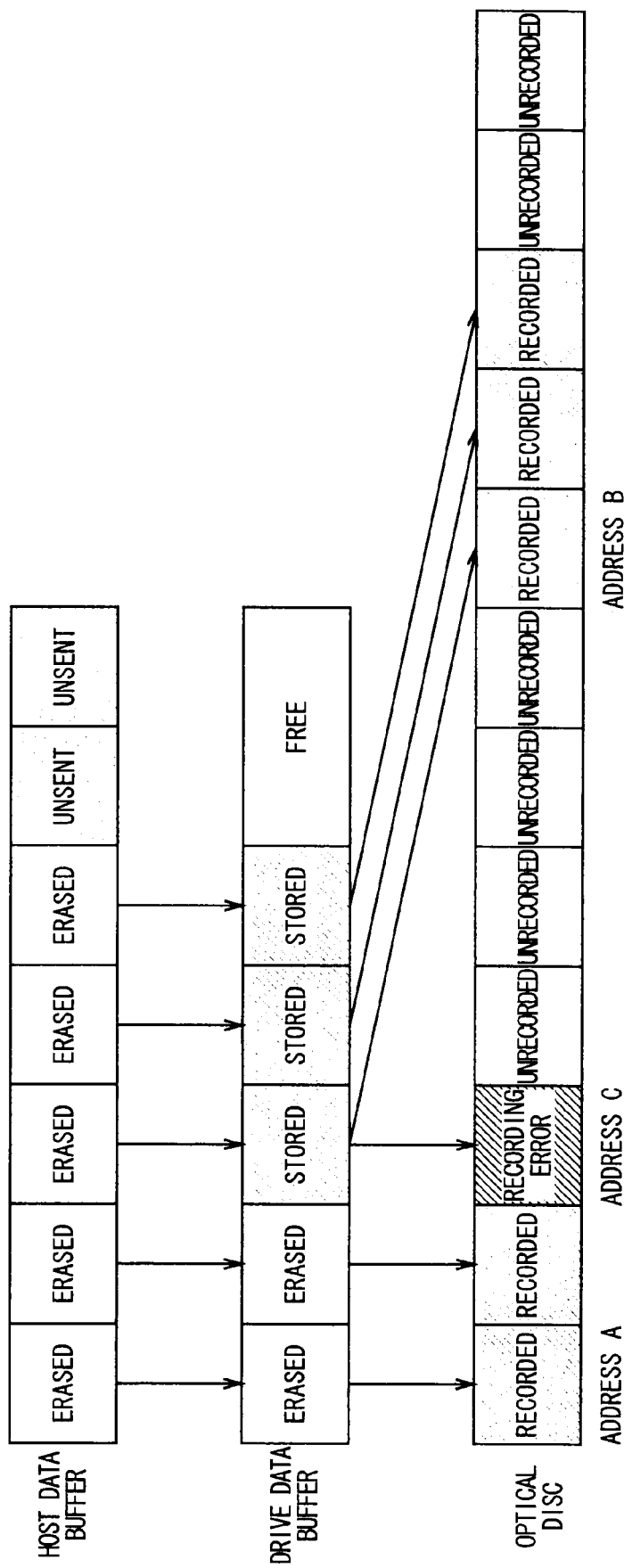
FIG. 3 is a schematic diagram showing the state of recording when a recording error occurs.

Then, the host control part 6, as shown in FIG. 3, establishes an unrecordable skip area from the error address C to address B, a predetermined address ahead, in order to avoid repetition of recording errors in the vicinity of the error-occurring location. The host control part 6 then transmits a recording resume address B to the drive unit 3 to resume the recording of the stream data.

In this state, the drive data buffer 10 of the drive unit 3 still contains the data to be recorded at the address where the recording error has occurred and the subsequent data as mentioned above. The host control part 6 therefore need not retransmit this data, and can terminate the communication with the drive unit 3 in only a short time of notifying the recording resume address B.

When the drive control part 9 of the drive unit 3 receives the recording resume address B, it resumes recording the stream data in the drive data buffer 10 from the address B of the optical disc 5 in response. Here, since the stream data is divided on the optical disc 5, the drive control part 9 manipulates the file system information on the optical disc 5 to logically combine the pieces of stream data.

In this way, the host control part 6 of the optical disc recorder 1 skips recording in the vicinity of the location where the recording error has occurred as a skip area. Besides, the data to be recorded at the address where the recording error has occurred and the subsequent data are held in the drive unit 3. As a result, data retransmission at the time of resuming recording can be omitted to record the stream data in real time at high speed with reliability.

(2) Procedure of Recording Processing According to Present Invention

Figure 4:
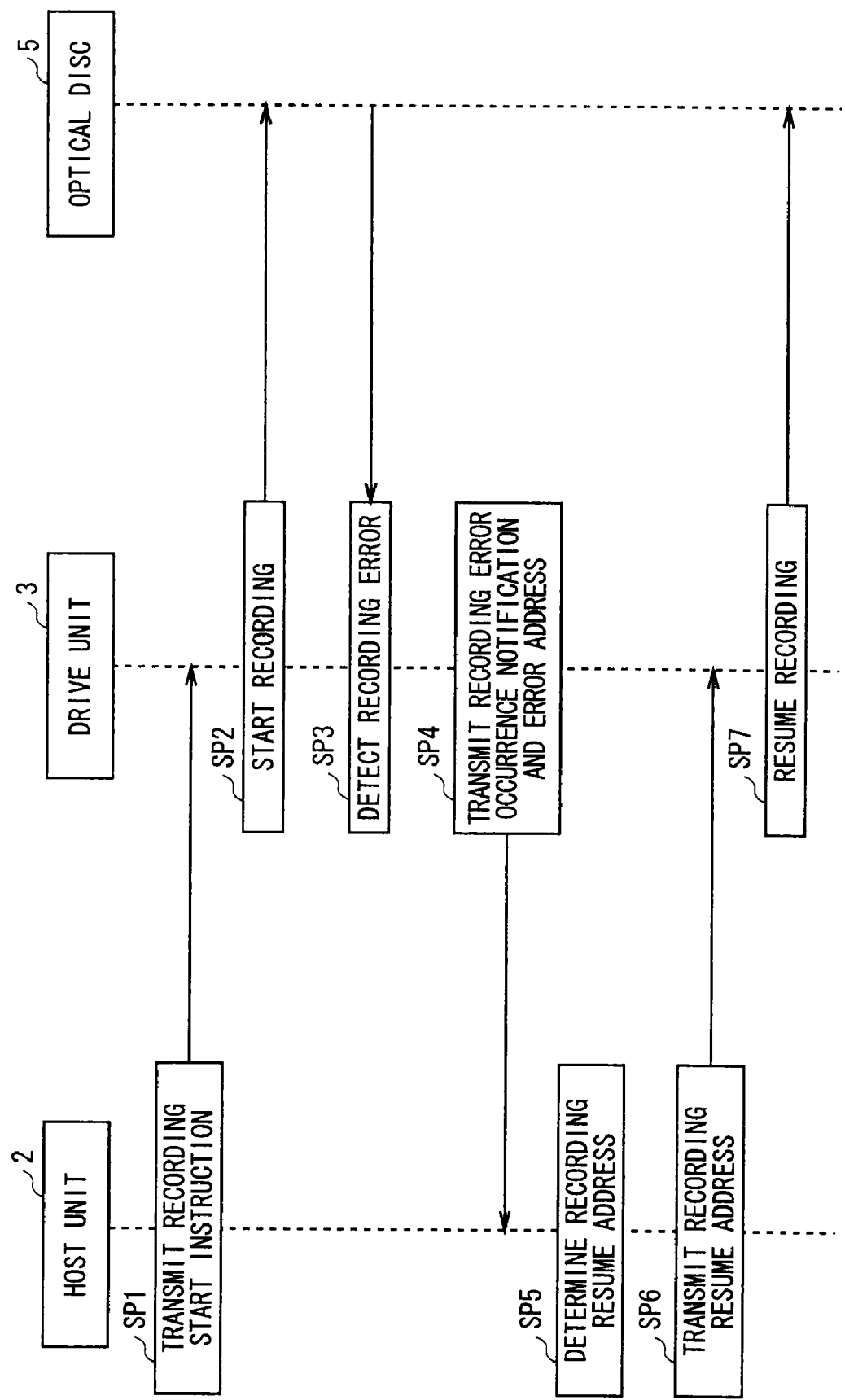
FIG. 4 is a timing chart showing the procedure of recording processing according to the present invention.

Next, the procedure of recording processing when recording the foregoing stream data in real time will be described with reference to the timing chart shown in FIG. 4.

According to a recording start operation made by the user, the host unit 2 of the optical disc recorder 1 encodes a video signal with the real-time encoder 7. When the generated stream data is accumulated up to a predetermined amount in the host data buffer 8, the host unit 2 transmits a recording start instruction and a recording start address to the drive unit 3, reads the stream data from the host data buffer 8, and starts supplying it to the drive unit 3 (step SP1).

At step SP2, the drive control part 9 of the drive unit 3, in response to the recording start instruction, temporarily accumulates the received stream data in the drive data buffer 10 while recording the stream data from the recording start address of the optical disc 5 and monitoring recording errors. Then, if the drive control part 9 detects a recording error at step SP3, it notifies a recording error occurrence notification and the error address to the host unit 2 at the next step SP4, with the data to be recorded at the address where the recording error has occurred and the subsequent data kept stored in the drive data buffer 10.

When the host control part 6 of the host unit 2 receives the recording error occurrence notification and the error address from the drive unit 3, it grasps, from the error address, how far the stream data has been normally recorded on the optical disc 5, and determines the skip area and the recording start address at step SP5. At the next step SP6, the host control part 6 transmits the recording resume address to the drive unit 3 to resume the recording of the stream data.

In response to reception of the recording resume address, the drive control part 9 of the drive unit 3 then resumes recording the stream data stored in the drive data buffer 10 from the recording start address of the optical disc 5 at step SP7.

(3) Operation and Effect

With the foregoing configuration, when the drive unit 3 of the optical disc recorder 1 detects a recording error during real-time recording of stream data on the optical disc 5, it transmits a recording error occurrence notification and the error address to the host unit 2 while keeping the stream data stored in the drive data buffer 10.

In response to the reception of the recording error occurrence notification, the host unit 2 determines a recording resume address across a skip area, and transmits the recording resume address to the drive unit 3 so that the recording of the stream data stored in the drive data buffer 10 is resumed from the recording resume address.

In this way, the optical disc recorder 1 skips recording in the vicinity of a location where a recording error has occurred as a skip area, and records stream data in the area subsequent to the skip area. This makes it possible to avoid repetition of recording errors in the vicinity of the error-occurring location where the possibility of repeating errors is high. The optical disc recorder 1 also holds the stream data in the drive data buffer 10 even after the occurrence of the recording error, so that the retransmission of the stream data can be omitted to eliminate the time loss for retransmitting the stream data when resuming recording. This can also reduce the storage space of the host data buffer necessary for storing stream data to be retransmitted.

According to the foregoing configuration, the optical disc recorder 1 of simple configuration can record stream data on the optical disc 5 in real time at high speed with reliability.

(4) Other Embodiments

Now, if the drive unit 3 has a defect management function for managing defects on optical discs, it may register the vicinities of error-occurring addresses to a defect table as defect areas in response to the occurrence of recording errors during streaming recording. Here, defect tables on the optical discs 5 need not necessarily be updated, but merely a defect table on the RAM of the drive unit 3 may be updated. When determining a recording resume address B, the host unit 2 can receive the information on the defect table from the drive unit 3 to skip defects and select a safe recording area.

Figure 5:
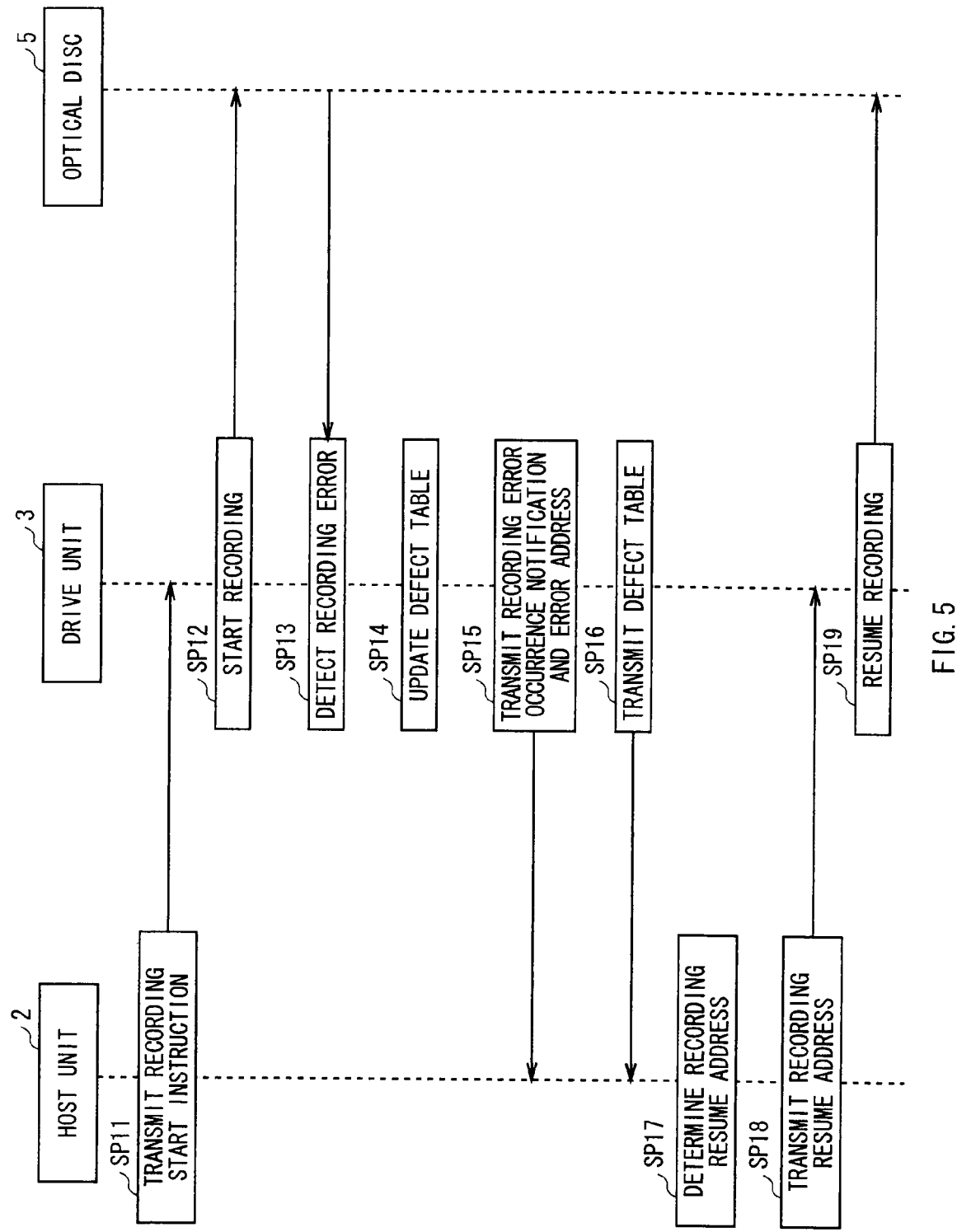
FIG. 5 is a timing chart showing the procedure of recording processing according to another embodiment.

More specifically, in the timing chart of the procedure of recording processing shown in FIG. 5, the host unit 2 of the optical disc recorder 1 encodes a video signal with the real-time encoder 7 in response to a recording start operation made by the user. When the generated stream data is accumulated up to a predetermined amount in the host data buffer 8, the host unit 2 transmits a recording start instruction and a recording start address to the drive unit 3, reads the stream data from the host data buffer 8, and starts supplying it to the drive unit 3 (step SP11).

At step SP12, the drive control part 9 of the drive unit 3, in response to the recording start instruction, temporarily accumulates the received stream data in the drive data buffer 10 while recording the stream data from the recording start address of the optical disc 5 and monitoring recording errors. Then, if the drive control part 9 detects a recording error at step SP13, it registers the vicinity of the error address to the defect table for update at the next step SP14. Moreover, at step SP15, the drive control part 9 notifies a recording error occurrence notification and the error address to the host unit 2 while keeping the stream data stored in the drive data buffer 10. At step SP16, the drive control part 9 transmits the updated defect table to the host unit 2.

When the host control part 6 of the host unit 2 receives the recording error occurrence notification, the error address, and the defect table from the drive unit 3, the host control part 6 grasps, from the error address, how far the stream data has been normally recorded on the optical disc 5, and determines the skip area and the recording start address based on the defect table and the error address at step SP17. At the next step SP18, the host control part 6 transmits the recording resume address to the drive unit 3 to resume the recording of the stream data.

In response to reception of the recording resume address, the drive control part 9 of the drive unit 3 then resumes recording the stream data stored in the drive data buffer 10 from the recording start address of the optical disc 5 at step SP19.

The foregoing embodiments have dealt with the cases where the drive unit 3 erases corresponding stream data from the drive data buffer 10 immediately after it completes recording on each ECC block normally. The present invention is not limited thereto, however. The recording reliability can be further improved if the stream data is held in the drive data buffer 10 over a certain period even after the recording is normally completed on each ECC block.

That is, while in the foregoing embodiments, the recording skips a predetermined range subsequent to an error address as a skip area for the sake of avoiding repetition of recording errors, reproduction errors may also occur prior to the error address.

Figure 6:
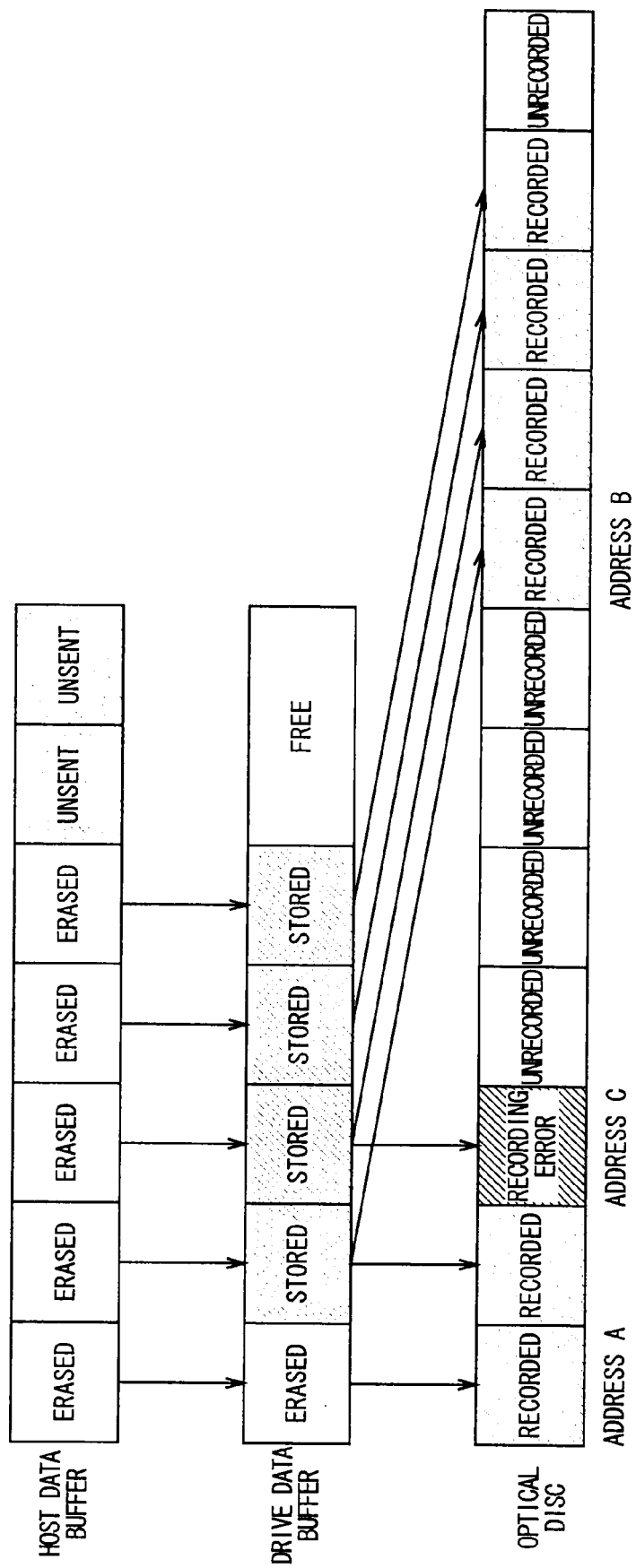
FIG. 6 is a schematic diagram showing the state of recording according to another embodiment.

To deal with such a problem, corresponding stream data may be held in the drive data buffer 10 for some period even after the recording is normally completed on the optical disc 5, so that when a recording error occurs, as shown in FIG. 6, data that is recorded not only at the error address but also recorded immediately before the error address for a further improvement in the reliability of recording.

Figure 7:
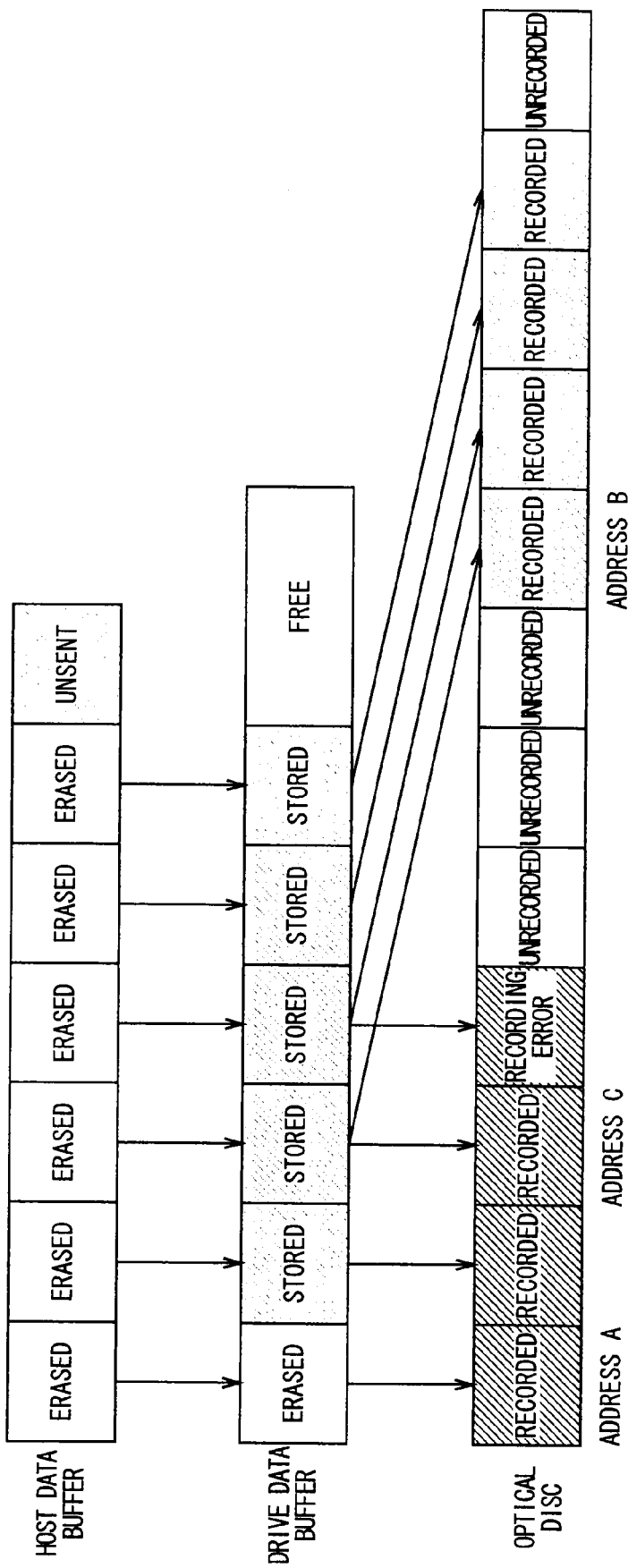
FIG. 7 is a schematic diagram showing the state of recording according to another embodiment.

Furthermore, when a recording error occurs, as shown in FIG. 7, the host unit 2 may select and re-record only a piece of stream data closer to the error address among those recorded prior to this error address, instead of re-recording all the pieces of stream data stored in the drive data buffer 10.

Industrial Applicability

The present invention is widely applicable to the cases of recording data on an optical disc at high speed.

EXPLANATION OF REFERENCE SYMBOLS

1 . . . OPTICAL DISC RECORDER, 2 . . . HOST UNIT, 3 . . . DRIVE UNIT, 4 . . . BUS, 5 . . . OPTICAL DISC, 6 . . . HOST CONTROL PART, 7 . . . REAL-TIME ENCODER, 8 . . . HOST DATA BUFFER, 9 . . . DRIVE CONTROL PART, 10 . . . DRIVE DATA BUFFER

The invention claimed is:

1. An optical disc recording apparatus having an optical disc drive and a host unit for controlling the optical disc drive, the optical disc drive comprising:

storing means for storing data supplied from the host unit;

recording means for sequentially reading data stored in the storing means and recording the stored data on the optical disc; and drive control means for erasing the data normally recorded on the optical disc from the storing means, detecting a recording error of data on the optical disc in parallel with the sequential reading of the data stored in the storing means and recording the stored data on the optical disc, and transmitting an address at which the recording error has occurred and a recording error occurrence notification to the host unit, in response to reception of the recording error occurrence notification, the host unit selects a predetermined range subsequent to the address at which the recording error has occurred as a skip area, and transmits a recording resume address for skipping the skip area to resume recording the data to the optical disc drive; and in response to reception of the recording resume address, the drive control means resumes recording the data stored in the storing means from the recording resume address of the optical disc, thereby avoiding a retransmission of data supplied from the host unit.

2. The optical disc recording apparatus according to claim 1, wherein the host unit combines the pieces of data recorded prior to and subsequent to the skip area with each other on a file system.

3. The optical disc recording apparatus according to claim 1, wherein the data is stream data generated by encoding a video signal.

4. A method of controlling recording of an optical disc recording apparatus having an optical disc drive and a host unit for controlling the optical disc drive, comprising:

detecting a recording error of data on the optical disc in parallel with recording operations of storing supplied data in storing means while sequentially reading and recording the supplied data on the optical disc, and erasing the data normally recorded on the optical disc from the storing means;

transmitting, if the recording error is detected, an address at which the recording error has occurred and a recording error occurrence notification from the optical disc drive to the host unit;

selecting, in response to reception of the recording error occurrence notification, a predetermined range subsequent to the address at which the recording error has occurred as a skip area, and transmitting a recording resume address for skipping the skip area to resume recording the data to the optical disc drive; and recording, in response to reception of the recording resume address, the data stored in the storing means from the recording resume address of the optical disc, thereby avoiding a retransmission of data supplied from the host unit.

* * * * *